United States Patent Office 3,098,849
Patented July 23, 1963

3,098,849
EXTRACTION OF AN ALKALOID FROM PHYLLANTHUS DISCODEUS
Jean Louis Paul Mainil, Watermael-Boitsfort, Brabant, Belgium, assignor to Societe Anonyme Oletta, Luxembourg, Luxembourg
No Drawing. Filed Aug. 15, 1958, Ser. No. 755,152
Claims priority, application Belgium Aug. 16, 1957
1 Claim. (Cl. 260—236)

This invention relates to methods of producing novel pharmaceutical products, namely alkaloids isolated from plants of the genus Phyllanthus (Euphorbiaceae) and more particularly from the *discodeus* species thereof.

Investigations have shown that an alkaloid suitable for use in human and veterinary therapy by virtue of its diuretic, cardiotonic and respiratory analeptical activity can be obtained in an advantageous yield and in economic manner from one of the varieties of the genus Phyllanthus.

This alkaloid takes the form of yellow crystals having a melting point of 136° C. Its elementary formula is $C_{13}H_{15}O_2N$. Its ultra-violet spectrum shows: Max. 255, 300; min. 295.

Logarithm $\epsilon$ at 255 millimus=4.19 for molecular weight 217.

In mice, its toxicity is: DL 50=95 mg./kg.

The salts of this alkaloid are white.

One of the known general methods for the isolation of plant alkaloids may be employed for the isolation of this new alkaloid.

The features of such a process will be more clearly apparent from the example given below by way of non-limitative illustration:

The plants, or parts thereof, such as fruits, leaves, bark or roots, depending upon the variety of the genus and the season in which they are gathered, are crushed and rendered alkaline with a 20% ammonia solution, a 10% or 5% sodium carbonate solution, or milk of lime or magnesia, or are wetted with water.

In the case of the *discodeus* species the extraction is effected from the roots.

After contact for several hours, the plant or part thereof is extracted in a Soxhlet type apparatus, a mixer, a percolator or a rotative extractor with ether, benzene, chloroform, ethyl acetate or other solvent.

After complete extraction of the plant material with one or a mixture of these solvents, the extracts are in turn extracted with an aqueous solution of an organic or mineral acid or a mixture of such acids, at a concentration of from 2% to 20%.

The alkaloid passes into the acid solution. It is liberated by making this solution alkaline with ammonia or sodium carbonate solution. The alkaloid is then extracted with a solvent or a mixture of solvents immiscible with water, such as ether or chloroform. On distillation of the extract so obtained, a residue is obtained, which residue is dried and which consists of the alkaloid with other substances and resins heretofore regarded as impurities.

These alkaloidal principles are dissolved and fixed on a chromatographic column of alumina, silica or an ion-exchange material. An eluent then removes the alkaloid which, when taken up in methanol, crystallizes in the form of beautiful yellow crystals. The recrystallization may be repeated a number of times.

It is also possible to obtain the crude alkaloidal residue by extraction of the plant with acid water or neutral or acid alcohol, concentration of the extract and extraction of the residue with a non-miscible solvent, in the alkaline phase.

The alkaloidal residue may be treated directly by successive recrystallizations until the pure product is obtained.

This alkaloid may be converted into mineral salts such as the sulphate, the hydrochloride or the nitrate (the latter being a stimulant for diuresis) or into organic salts, such as the tartrate, citrate, gluconate, camphorate or camphosulphonate.

To form the camphosulphonate, a predetermined quantity of the basic alkaloid is dissolved in methanol and a solution of camphosulphonic acid in methanol is added to give a pH of 5. Long white needles having a melting point of 152° C. are formed. It is also possible to proceed by double decomposition.

The base may also be employed as a starting product for the preparation of the camphosulphonate of ethylene diamine and of the alkaloid. For this purpose, a quantity of alkaloid base is weighed and dissolved in hot methanol, 25% of ethylene diamine is added, and the mixture is thereafter neutralized by the addition of camphosulphonic acid to a pH of 7.5 to 8. On concentration, a yellowish product crystallizes out. On washing with ether, a slightly pink product having a melting point of 202° C. is obtained.

What I claim is:

A process for preparing an alkaloid comprising finely grinding a part of the *discodeus* species of the genus Phyllanthus (Euphorbiaceae), rendering said part alkaline, subjecting the resulting product to the action of a solvent selected from the group consisting of ether, benzene, chloroform and ethyl acetate to extract the active material from the plant, acidifying the extract, adding a base to make the solution alkaline thereby forming a crude alkaloidal product and then recovering and purifying the alkaloid by recrystallization.

References Cited in the file of this patent

UNITED STATES PATENTS

| | | |
|---|---|---|
| 2,491,741 | Ledrut | Dec. 20, 1949 |
| 2,509,051 | Applezwieg | May 23, 1950 |
| 2,740,787 | Mehltretter | Apr. 3, 1956 |

OTHER REFERENCES

Mercier: J. Pharm. Chem. (9), volume 1, pages 287–92 (1940).

Kirk et al. (Ed.): Encyclopedia of Chem. Tech., volume 1 (1948), pages 507–515.

Degering: An Outline of Organic Nitrogen Compounds, Univ. Lithoprinters, Ypsilanti, Michigan (1950), pages 39 and 40.

Willaman et al.: Economic Botany, volume 9, No. 2 (April–June 1955), pages 143 and 144.

Willaman et al.: Amer. Jour. Pharmacy, volume 129 (1957), pages 246–250.